(12) United States Patent
Lekkalapudi

(10) Patent No.: US 10,038,761 B1
(45) Date of Patent: Jul. 31, 2018

(54) METHOD AND SYSTEM FOR PREDICTIVE LOADING OF SOFTWARE RESOURCES

(71) Applicant: EMC Corporation, Hopkinton, MA (US)

(72) Inventor: Chaithanya Lekkalapudi, Palamaner (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 14/851,590

(22) Filed: Sep. 11, 2015

(51) Int. Cl.
  G06F 15/16 (2006.01)
  H04L 29/08 (2006.01)
  H04L 12/24 (2006.01)

(52) U.S. Cl.
  CPC .......... H04L 67/34 (2013.01); H04L 41/0253 (2013.01)

(58) Field of Classification Search
  CPC ............................ H04L 67/34; H04L 41/0253
  USPC ........................................................ 709/219
  See application file for complete search history.

(56) References Cited

U.S. PATENT DOCUMENTS

| | | | | |
|---|---|---|---|---|
| 2004/0216082 A1* | 10/2004 | Sun | ...................... | G06F 12/0891 717/100 |
| 2004/0216097 A1* | 10/2004 | Sun | ........................ | G06F 12/121 717/154 |
| 2011/0145303 A1* | 6/2011 | Boldyrev | .......... | G06F 17/30433 707/812 |
| 2014/0006411 A1* | 1/2014 | Boldyrev | .......... | G06F 17/30336 707/741 |
| 2015/0227118 A1* | 8/2015 | Wong | ..................... | G05B 15/02 700/44 |

* cited by examiner

Primary Examiner — Alan S Chou
(74) Attorney, Agent, or Firm — Chamberlain Hrdlicka

(57) ABSTRACT

In general, embodiments of the technology relate to a method for predictive loading of software resources in web applications. The method includes determining, based on a current state of the web application, one or more predicted future states of the web application. Determining the predicted future states includes predicting a first set of possible future states based on use case data and determining an associated probability for each possible future state in the first set of possible future states, and identifying, from the first set of possible future states, a first predicted future state. The first predicted future state is the possible future state in the first set of possible future states with the highest associated probability. The method further includes determining resources required by the predicted future states, and loading the resources required by the predicted future states.

14 Claims, 6 Drawing Sheets

METHOD AND SYSTEM FOR PREDICTIVE LOADING OF SOFTWARE RESOURCES

BACKGROUND

A web application is a software application that executes in a web browser. The web application may require the loading of additional resources as users are accessing different elements of the web application.

DETAILED DESCRIPTION

Figure 1:
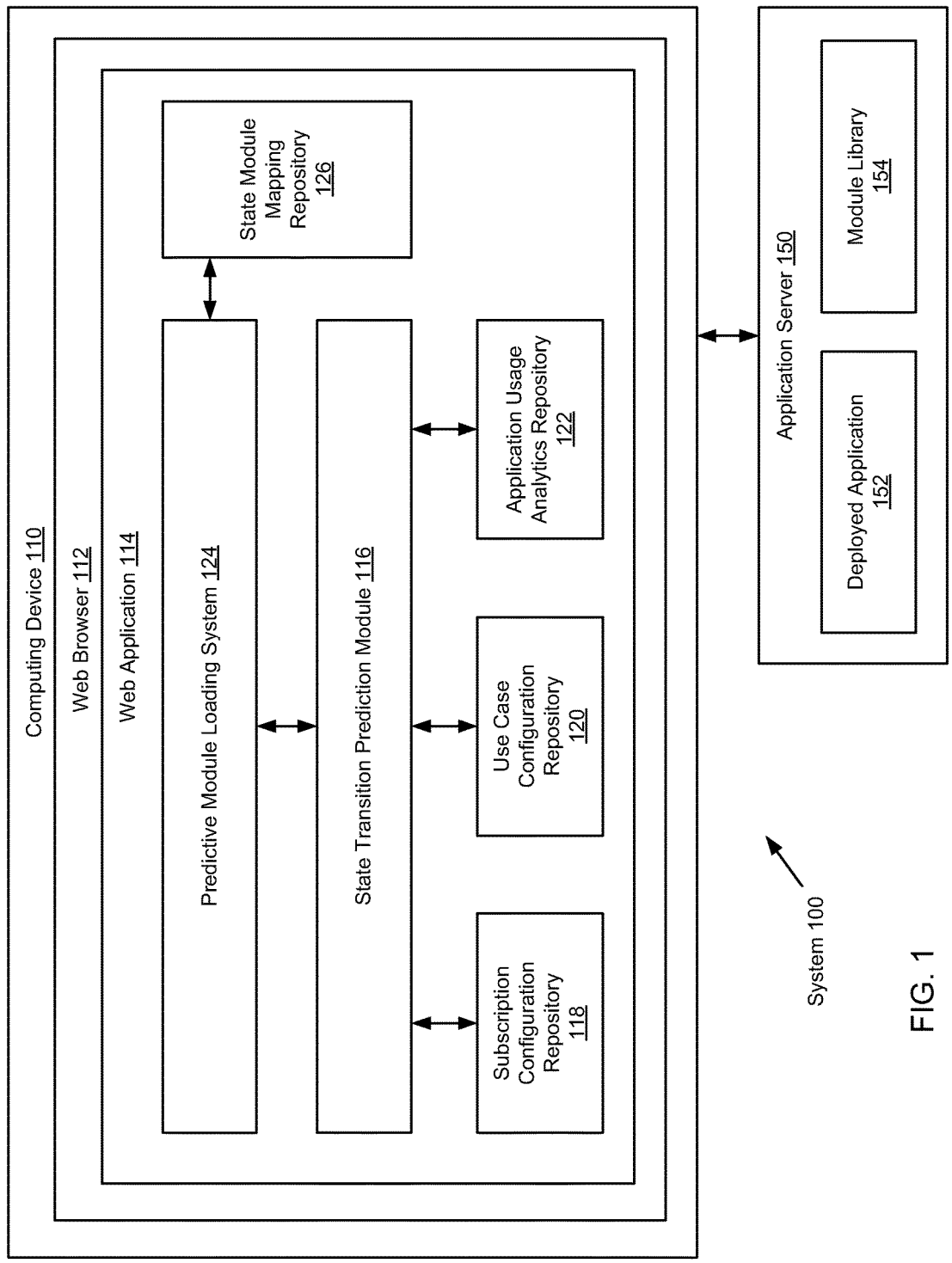
FIG. 1 shows a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 4:
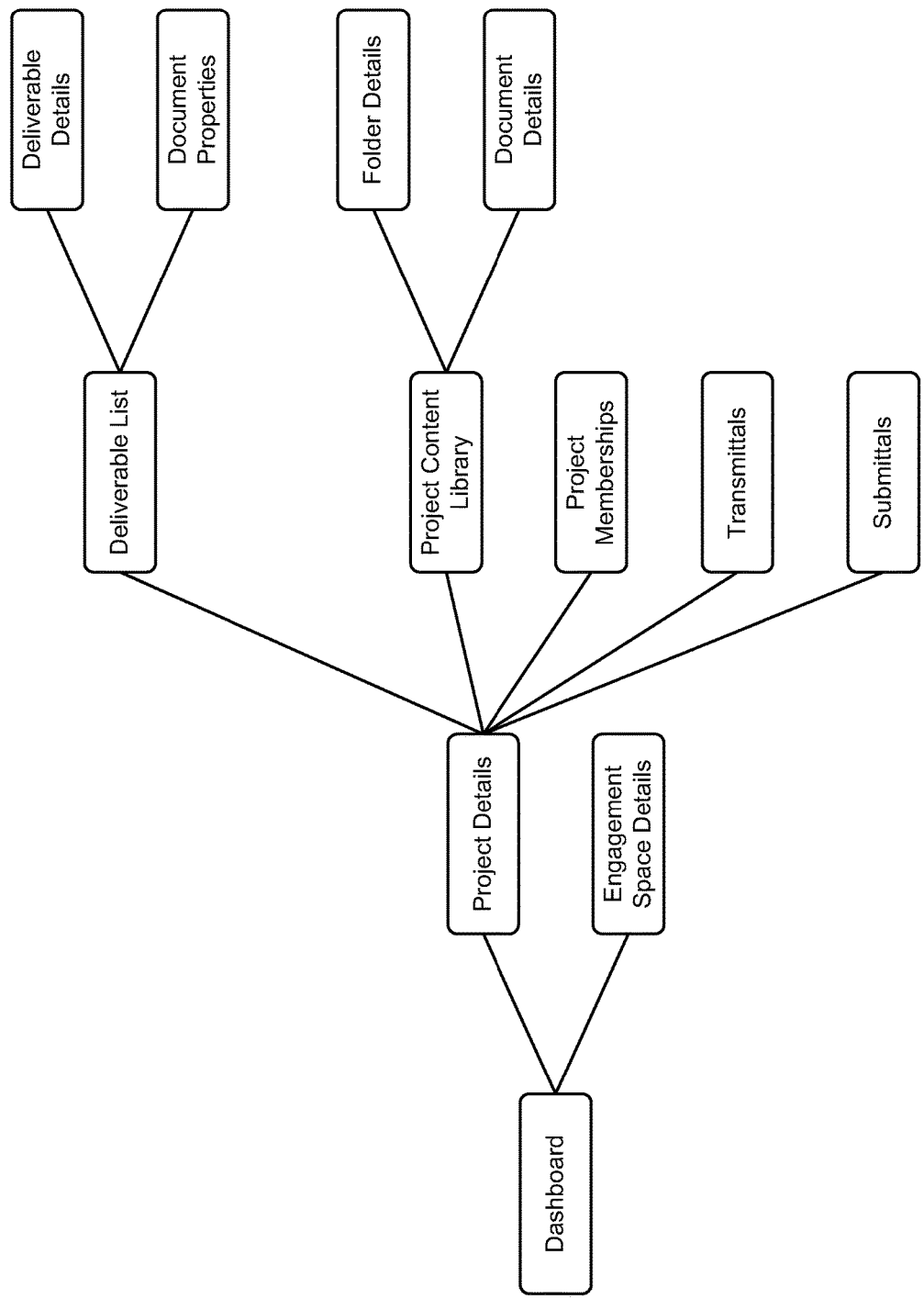
FIG. 4 shows an exemplary web application modeled as a state machine in accordance with one or more embodiments of the technology.

In general, embodiments of the technology are directed to the loading of resources pertaining to functionalities of web applications. More specifically, one or more embodiments of the technology include functionality to predict the future state of the web application, based on a current state of a web application, and/or based on current and/or past user activity that may have caused the transition of the web application through various states. The predicted future state may enable the identification of resources required for the predicted future state, which may then be proactively loaded by the web application. The prediction of future states may be based on, for example, the web application being modeled as a finite state machine. More specifically, a particular configuration of the web application (i.e., the totality of the page being accessed, certain options and parameters, etc.) may be considered a state, and the transition to a different configuration may be considered a state transition. A non-limiting example of a web application modeled as a state machine is shown in FIG. 4. The state machine (which may be a finite state machine) may describe multiple or all possible states and state transitions of the web application. Predictions of future states may be performed based on use case data, e.g., based on states and state transitions obtained from modeling specific underlying scenarios, e.g., tasks that are frequently performed by users. Prediction of future states may further be performed based on application usage analytics, e.g., based on previously observed usage patterns. The predictions of future states obtained from use case data and application usage analytics may then be used to identify the resources required for the predicted future states. These resources may subsequently be proactively loaded, such that a user does not have to wait for the resources to be loaded when accessing the functionalities of the predicted future state. For example, a predicted future state may require the loading and execution of extensive code segments. Proactive loading and execution of these code segments may make the functionalities affiliated with the code segments readily available to the user, once the users accesses these functionalities. This, in turn, may provide a better user experience for the user.

FIG. 1 shows a schematic diagram of a system in accordance with one or more embodiments of the technology. Specifically, FIG. 1 shows a schematic diagram of a system (100) enabling a user to interact with a web application (114) executing in a web browser (112) on a computing device (110). As shown in FIG. 1, the system may further include an application server (150). Each of these components is described in detail below.

As previously noted, the system (100), in accordance with one or more embodiments of the technology, includes a computing device (110). A computing device may be similar to the exemplary computing device shown in FIG. 6, and may be any type of mobile, desktop, server, embedded, or other hardware capable of performing at least one of the steps described below with reference to FIGS. 2 and 3. The computing device may be connected to a network (not shown) (e.g., a local area network (LAN), a wide area network (WAN) such as the Internet, mobile network, or any other type of network) via a network interface connection (not shown), thereby enabling the computing device to communicate with the application server (150).

In one or more embodiments of the technology, the computing device (110) may have executing thereon a web browser (112). The web browser may provide a platform for the execution of a web application (114), which may be displayed to the user of the computing device as one or more web pages. The web browser may be a software application for retrieving, presenting and traversing content resources (e.g., documents formatted and annotated with hypertext markup language (HTML), JavaScript, Cascading Style Sheets (CSS), and any language and/or any other language extensions necessary for executing the web application (114)).

In one or more embodiments of the technology, the web browser (112) may host the web application (114). The web application may be web browser-executable code (including, e.g., HTML, JavaScript and/or CSS elements) that includes various features/functionality. The user of the web application(s) may utilize these features via the web pages displayed in the web browser. When a user initially accesses the web application, the web application may be obtained from the application server (150), where the web application may be stored as a deployed application (152). The web browser may then execute the received deployed application as the web application.

In one or more embodiments of the technology, the web application may be modularized such that certain functionalities of the web application are provided using modules. The deployed application (152), initially loaded and executed when a user accesses the web application, may not include all functionalities of the web application. These functionalities may be implemented by additional modules. Accordingly, the web application may need to load additional modules before certain functionalities become available.

In one or more embodiments of the technology, the web application may include a predictive module loading system (124) and a state transition module (116) that may enable the web application to predictively loaded modules, before a user requests the modules, thus reducing the delay the user may experience as a result of the loading of modules. The details related to one or more embodiments of the predictive loading of modules are described below with reference to FIGS. 2 and 3.

In one or more embodiments of the technology, the state transition prediction module (116) includes functionality to predict one or more future states of the web application (114). Based on the predicted future states, the appropriate modules may then be loaded by the web application. Additional details regarding states and state transitions are provided below, with reference to the non-limiting examples shown in FIGS. 4, 5A and 5B. The state transition prediction module (116) may, in one embodiment of the technology, use a heuristic approach to make predictions of future states.

In one or more embodiments of the technology, the heuristic approach for predicting future states may be based on some or all of the following data:

(i) Run-time application context, which may include information such as user privileges, subscription details and the current state of the web application. User privileges and subscription details may determine what features may be available to a user accessing the web application. The state transition prediction module may therefore only consider states that relate to features that are accessible to the user. Those skilled in the art will appreciate that the technology is not limited to the aforementioned run-time context. In addition to user privileges, subscription details and the current state of the web application, any characteristic, property, setting and/or event that may affect the availability of a state as a future state of the web application may be considered as run-time context. The run-time application context may be stored in the subscription configuration repository (118) and/or in the state module mapping repository (126).

(ii) Use case data, which may include state transition information pertaining to various pre-defined use cases for the web application. Pre-defined use cases may be added, for example, for frequently performed tasks that result in a reproducible sequence of states. A sample use case is described below, with reference to FIG. 5B. Based on similarities between the state transitions of the web application and the state transitions of the use case, a likeliness that a future state of the use case is also a future state of the web application may be determined. The use case data may be stored in the use case configuration repository (120).

(iii) Application usage analytics, which may include historical usage patterns of the web application. Historical usage patterns may include state transition information captured while the user of the web application (114) and/or other users that may be local or remote, e.g., using a different instance of the web application, are using the web application. These data may be captured by web application monitoring systems, as part of usage tracking analytics performed by the web application and/or extensions of the web application. The historical usage patterns may be used to assess the likeliness of a particular future state, based on how frequently the web application transitioned to that particular state in the past. The historical usage patterns of the web application may be stored in the application usage analytics repository (122).

The methods used for the prediction of future states based on run-time application context, use case data and application usage analytics are described below, with reference to FIGS. 2 and 3. These methods may be implemented by the state transition prediction module (116).

In one or more embodiments of the technology, the web application (114) includes a subscription configuration repository (118). The subscription configuration repository may store run-time application context such as information regarding users, user groups, subscriptions to various services and information regarding user privileges. The subscription and privilege information may be used for determining reachability of a predicted future state, given the run-time application context. Consider, for example, a scenario where a user does not have a subscription for module "B". A state that requires module "B" may therefore be eliminated from the predicted states. The subscription configuration repository (118) may be implemented using any format suitable for the storage of users, user privileges, subscriptions, etc. and may be stored in volatile and/or non-volatile memory.

In one or more embodiments of the technology, the web application (114) includes a use case configuration repository (120). The use case configuration repository may store state transition information pertaining to various pre-defined web application use cases. As previously explained, web applications may be modeled as finite state machines, where a sequence of states in a particular order may represent the execution of a particular task, using the web page. Sequences of states representing the execution of one or more selected tasks may be documented in the use case configuration repository as shown, for example, in Table 1 below, where $S_1, S_2, \ldots S_{10}$ pertain to various states of the application. A future state may be predicted based on the modeled state transitions in the use cases, as described in detail below, with reference to FIG. 3.

TABLE 1

Sample content of use case configuration repository

| | |
|---|---|
| Use case 1 | $S_1 \to S_2 \to S_3 \to S_4 \to S_2 \to S_1$ |
| Use case 2 | $S_1 \to S_2 \to S_8 \to S_9 \to S_{10} \to S_2 \to S_1$ |
| Use case 3 | $S_1 \to S_5 \to S_{10} \to S_2 \to S_1$ |

The use case configuration repository (120) may be implemented using any format suitable for the storage of use cases and the states affiliated with the use cases and may be stored in volatile and/or non-volatile memory. Accordingly, the manner in which use cases (and their affiliated states) are stored is not limited to any particular data structure or any particular storage medium.

In one or more embodiments of the technology, the web application (114) includes an application usage analytics repository (122). The application usage analytics repository may store information regarding historical usage patterns of the web application. The historical usage patterns may describe how users have navigated through states of the web application and may be used for predicting a future state based on previously observed state transitions.

The application usage analytics repository (122) may be implemented using any format suitable for the storage of historically observed state transitions and may be stored in volatile and/or non-volatile memory. Accordingly, the implementation of the application usage analytics repository is not limited to any particular data structure or any particular storage medium. The application usage analytics repository may be updated continuously, periodically, or one-time, based on application usage data provided by a usage tracking service that monitors the usage of the web application by the user. The usage tracking service may be a component of the web application, or it may be an external module interfacing with the web application. The external module may be located on the computing device, or it may be remote, e.g., it may be a cloud service or a server performing usage analytics.

In one or more embodiments of the technology, the web application (114) may further include a predictive module loading system (124). The predictive module loading system may include functionality to retrieve information regarding modules required for the future predicted state (as predicted by the state transition prediction module (116)) and for providing the retrieved information to the web application, such that the web application may load these modules.

In one or more embodiments of the technology, the predictive module loading system (124) may retrieve the information regarding modules required for future predicted states from the state module mapping repository (126). The state module mapping repository may store mappings between application states and modules required by the state. These mapping may be stored, for example, using relationships as shown below in Table 2.

TABLE 2

Sample content of state module mapping repository

| Application State | Modules |
|---|---|
| Content Library | m1, m2, m3 |
| Search | m5, m6, m7 |
| Transmittals | m1, m2, m6 |

In on or more embodiments of the technology, the state to module mappings in the state module mapping repository may further include user privileges and subscription details, which may represent run-time application context in addition to or, as an alternative to, the run-time application context provided in the subscription configuration repository (118). The state module mapping repository may include user privileges and subscription information especially for complex web applications with numerous functionalities in modules that may or may not be available depending on a user's subscription and a user's privileges, thus enabling the application to selectively load modules based on a user's subscriptions and privileges.

The state module mapping repository (126) may be implemented using any format suitable for the storage of application states and the modules required for these application states, and may be stored in volatile and/or non-volatile memory. Accordingly, the implementation of the state module mapping repository is not limited to any particular data structure or any particular storage medium.

Continuing with the discussion of the system (100), shown in FIG. 1, the system, in accordance with one or more embodiments of the technology, further includes an application server (150) that includes the deployed application (152) and a module library (154). The application server may be executing on a computing device similar to the exemplary computing device shown in FIG. 6. The computing device executing the application server may include physical or virtual server hardware including at least a processor, memory, persistent storage, and a communication interface. The application server (150) may be on-premises, operated by the legal entity (e.g. the company) providing, using and/or administrating the system (100). Alternatively, the application server may be hosted by a third party, e.g., in a datacenter. Further, the application server may be cloud-based, e.g. the application server may provide its services as a software as a service (Saas). Although a single application server (150) is shown in FIG. 1, components of the application server may be distributed over multiple computing devices, either locally or remotely. The application server may be connected to a network (e.g., a local area network (LAN), a wide area network (WAN) such as the Internet, mobile network, or any other type of network) via a network interface connection (not shown), thereby enabling the application server to communicate with the computing device (110).

The web browser (112), executing on the computing device (110) may connect to the application server to obtain the deployed application (152) when a user initiates use of the web application (114). The web browser may then execute the received deployed application as the web application. The deployed application (152), in accordance with one or more embodiments of the technology, includes the resources that, when loaded and executed by the web browser (112) may form the web application (114). The deployed application may include, for example, HTML, JavaScript and CSS instructions that define appearance and function of the web application.

The web browser (112), executing on the computing device (110), may further connect to the application server (150) to obtain a module from the module library (154), whenever the predictive module loading system (124) indicates that a module may be required for a state predicted by the state transition prediction module (116). Each module, stored in the module library (154) may include, for example, HTML, JavaScript and/or CSS instructions providing additional functionality to the web application, that may be needed for the state predicted by the state transition prediction module (116). The module library (154) may be a repository, for example a database or a directory, storing all or at least some of the modules that may be requested by the web application (114), during the execution of the web application.

One skilled in the art will recognize that the architecture of the system is not limited to the components shown in FIG. 1. A web application may include elements in addition to the elements shown in FIG. 1, without departing from the technology. A web application may include, for example, various input and output elements such as textboxes, images, menus, etc. thus enabling a user to interact with content displayed by the web page. Further, the communication of the web application may not be limited to communications with the application server. The web application may, for example, communicate with additional application servers that may provide content to the user, without departing from the technology Further, the execution of the web application may also not be limited to operation within a browser window. The application may, for example, be executed without requiring a browser window. Also, even though in the description of FIG. 1, modules to be loaded from the module library are primarily discussed as code providing certain functionalities, the technology is not limited to modules including web application-enhancing code. Rather, modules may include any type of resource that may be integrated with or that may interface with the web application, including content, e.g. data in the form of databases, audio and/or video content to be loaded, etc., services, e.g. third party analytics services, etc.

Figure 2:
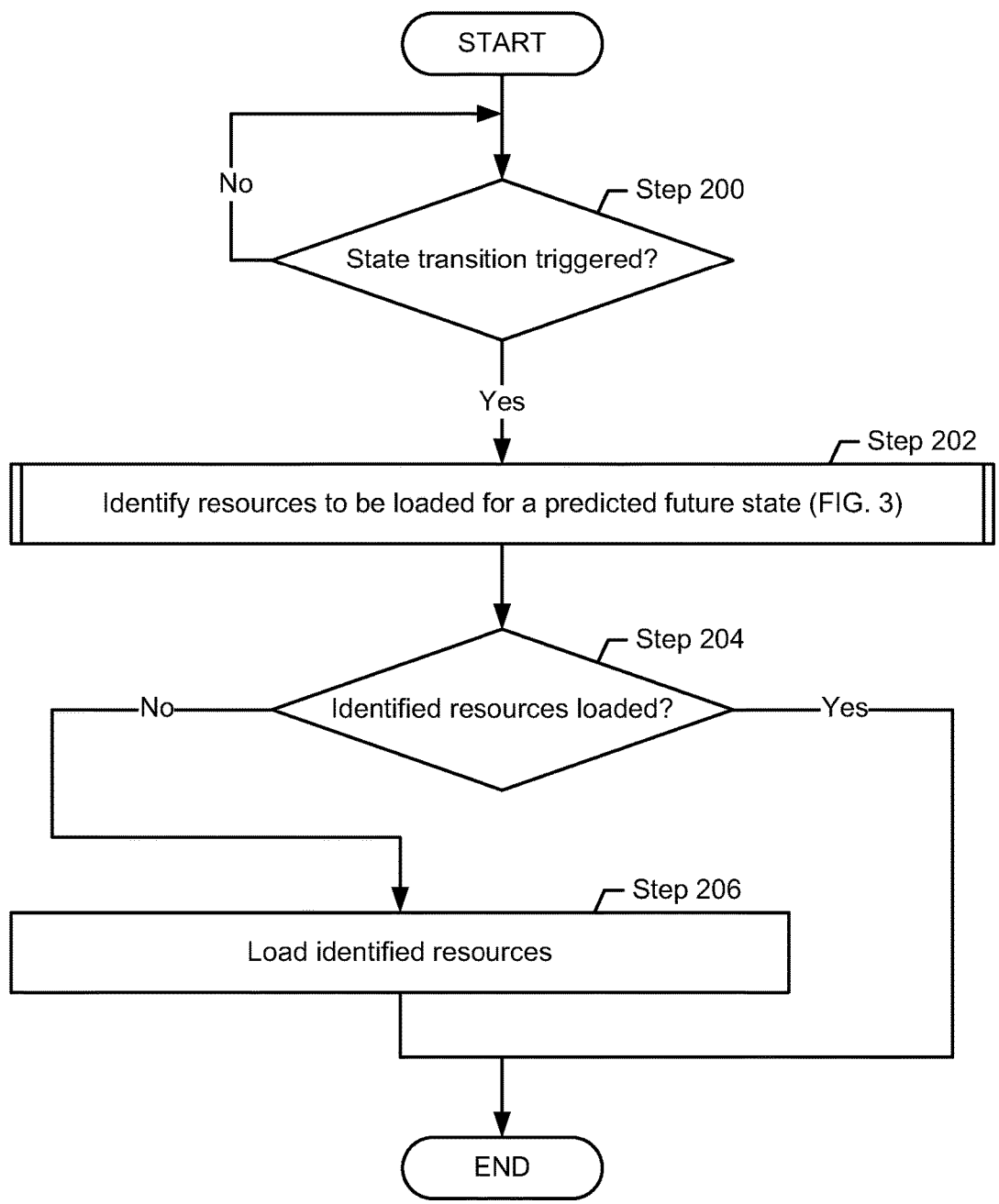
FIGS. 2 and 3 show flowcharts in accordance with one or more embodiments of the technology.
Figure 3:
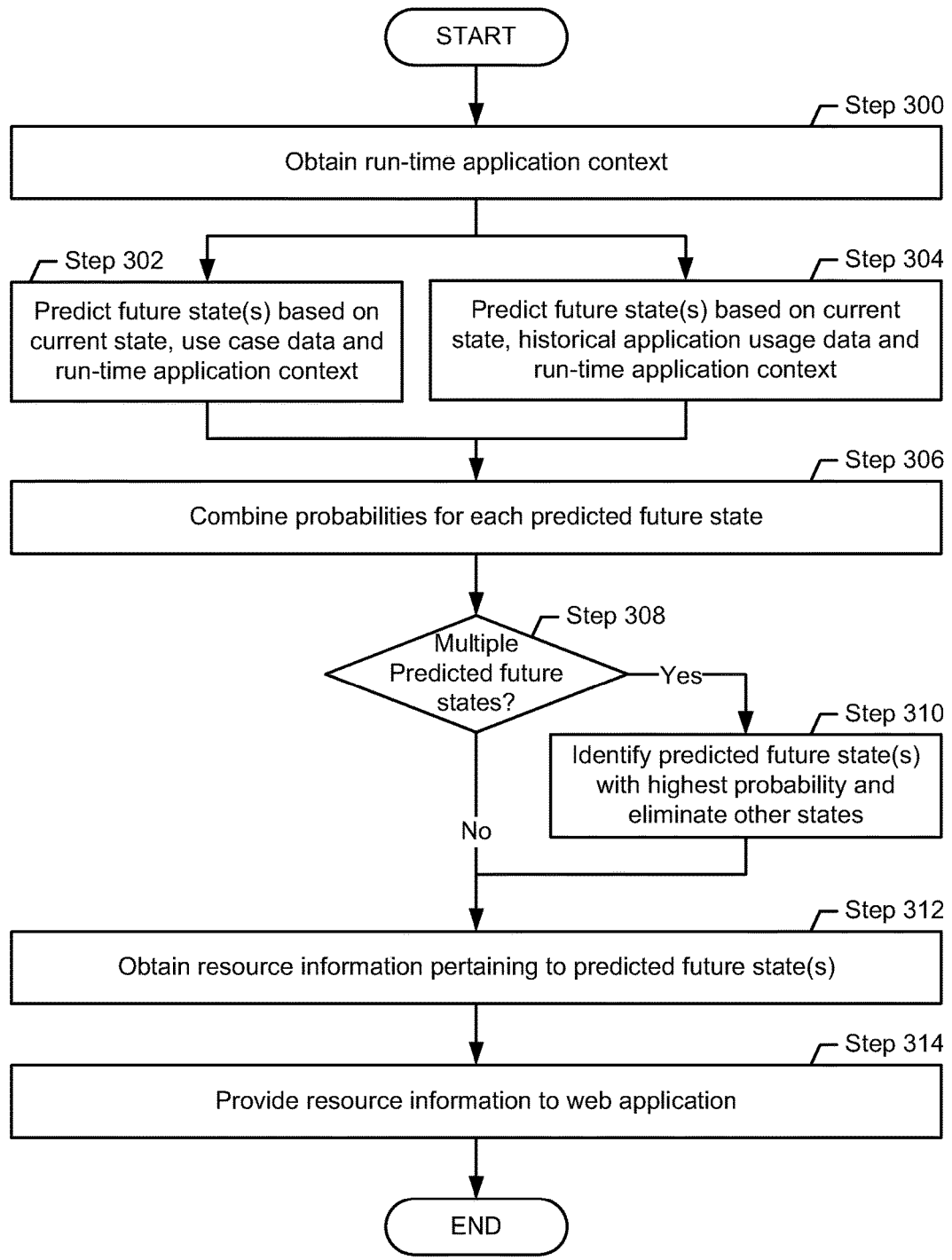

FIGS. 2 and 3 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 2 and 3 may be performed in parallel with any other steps shown in FIGS. 2 and 3 without departing from the technology.

FIG. 2 shows a method for the loading of a software resource by a web application. The method shown in FIG. 2 may be executed each time a state transition results in the possibility of additional software resources being required by the web application.

Turning to FIG. 2, in Step 200, a determination is made about whether a trigger event is causing or may be causing a state transition. A trigger event may be, for example, any kind of user interaction with the web application (e.g., a user clicking on a link) or a web-application internal event (e.g., the completed execution of a script), etc. If no trigger even is detected, the method may remain in Step 200. If a determination is made that a trigger event may be causing a state transition, the method may proceed to Step 202.

In Step 202, the resources to be loaded, based on a predicted future state, are identified. Based on the detection of an upcoming state transition, the future state(s) may be predicted. For example, future states may be predicted upon entering a new state, thus obtaining a prediction of future states that may be reached from the newly entered state. Once the future state(s) is determined, the resources required by the future state(s) may be identified. The details of Step 202 are described in FIG. 3.

In Step 204, a determination is made about whether the resources identified in Step 202 have already been loaded. If the resources have already been loaded, the execution of the method may terminate. If the resources have not yet been loaded, the method may proceed to Step 206.

In Step 206, the identified resources may be loaded, where the resources are identified using the resource information obtained in step 314 (discussed below). In one embodiment of the technology, the identified resources are loaded from the module library on the application server.

FIG. 3 shows a method for identifying resources to be loaded, based on a predicted future state. The method may be executed each time a transition to a new state is imminent, is expected, or is at least possible. As described above with reference to FIG. 2, the execution of the method described in FIG. 3 may be triggered by an event that precedes a state transition. In one or more embodiments of the technology, the method may predict a single or multiple possible future states, and a future state may require any number of resources. In one or more embodiments of the technology, possible future states may be predicted using the algorithms described below. The prediction may be performed using only a single method or using a combination of methods. In one embodiment of the technology, the steps in FIG. 3 may be performed by the web application. In alternative embodiments, one or more of the steps in FIG. 3 may be performed elsewhere, for example, by a web worker (e.g., a script executing in the background) and/or by a remote service, e.g., a cloud-based service, a service offered by the provider of the application or by a third party.

Turning to FIG. 3, in Step 300, the run-time application context is obtained. The run-time application context may be obtained one-time, for example, during the initialization of the web application, or it may be obtained periodically from the web application. As previously explained, run-time application context may include information such as user privileges, subscription details, and the current state of the web application. The run-time application context may be obtained from the state module mapping repository and/or from the subscription configuration repository. Additional run-time application context may be obtained by parsing the application source code, for example, in order to identify interdependent software modules, etc. Additional run-time application context may also be provided manually, for example, by the administrator.

In Steps 302 and 304, the future state(s) of the web application is/are predicted. The probabilistic state prediction algorithms of Steps 302 and 304 may provide a mechanism to accurately predict the future state of the application, even when more than one application state has been identified as possible future states of the application. Step 302 may perform a prediction based on use case data, whereas Step 304 may perform a prediction based on historical application usage patterns. Application usage patterns, caused by a user operating the application, may be divided into structured navigation patterns and random navigation patterns. Structured navigation patterns may be patterns where a user would go through a sequence of application states in order to perform a particular task in a goal directed manner. Such structured navigation patterns may therefore be systematic and reproducible. Use case-based probabilities may be used to determine a likeliness of possible future states of the web application for usage patterns that are systematic and reproducible (Step 302). Random navigation patterns may be attributed to a user who would typically login to the web application to do more than a single task, thus accessing various parts of the application in a single session. The user may thus generate a navigation pattern that may appear to be seemingly random, lacking the systematic, reproducible patterns of the previously described structured navigation pattern. Historical application usage data may be used to determine a likeliness of possible future states of the web application for usage patterns that appear to lack systematic, reproducible patterns (Step 304).

In one or more embodiments of the technology, the predictions made by the methods of Steps 302 and 304 may consider run-time application context. The run-time application context, obtained, for example, from the subscription configuration repository and/or from the state module mapping repository, may be used to determine whether a predicted state may be accessible by the web application, given the current run-time application context. For example, a state may not be accessible if the user of the web application is not authorized to access the state, based on the user's privileges. States that are non-reachable, based on the current run-time application context, may not be considered future states.

Steps 302 and 304 may be performed in parallel or sequentially. Further, additional prediction methods may be implemented that may also execute either in parallel or sequentially with the methods described in steps 302 and 304. In one or more embodiments of the technology, only Step 302 or only Step 304 may be executed. For example, in smaller and medium size web applications, a prediction of future states may therefore be solely based on use case data.

In one or more embodiments of the technology, a predicted future state of the web application is any state of the web application that may be reached, directly or indirectly. A state that may be reached directly is a state that is immediately adjacent to the current state. A state that may be reached indirectly is a state that is separated from the current state by one or more intermediate states. Accordingly, depending on the configuration of the state transition prediction module, a predicted future state may be state that may be reached directly from a current state of the application, and/or it may be a state that may be reached via intermediate states.

Consider for example, a scenario that is based on the exemplary web application modeled as a state machine, shown in FIG. 4 (see below for a discussion of FIG. 4). Assume that the user currently is in the state "Project Content Library". Accordingly, the next states may be either "Folder Details" or "Document Details" if the user chooses to perform a task requiring these states, or it may be "Project Details", for example if the user decides to return toward the "Dashboard".

Alternatively, consider a prediction of a state that is not directly connected to the current state. Such a prediction may be meaningful, for example, if users, after completing one task, typically move on to the next task, and where the transition from the current task to the next task requires the transition through multiple states. In such a scenario it may be beneficial to predict not only the immediate next state, but also the additional states required to perform the next task. For example, in the exemplary web application shown in FIG. 4, a user may have completed certain document details while being in the state "Document Details". Because this is the last step toward finalizing the project, the user may subsequently navigate to the state "Submittals" in order to submit the project. In this case, the prediction may include not only the immediate next state "Project Content Library", but also the states "Project Details", and "Submittals".

Returning to the discussion of FIG. 3, in Step 302, a future state or future states of the web application is/are predicted based on the current state and use case data. The prediction result may include multiple possible future states. The likeliness of different possible future states may vary, and the method in accordance with one or more embodiments of the technology may select a predicted future state from the set of possible future states based on a high likeliness of this possible future state being the next state. In Step 302, possible future states and the probabilities of transitions to these possible future states may be determined based on a comparison of states that the web application has transitioned through with predefined sequences of states defined by use cases. A high degree of similarity between the past state transitions of the current session of the web application and state transitions of a particular use case may result in the assignment of a high probability to the future state obtained from this particular use case. The high probability may be based on the state of the web application evolving similarly to the state transitions of the use case, thus suggesting that the next state in the sequence of states in the use case may be the next (future) state of the web application.

In one or more embodiments of the technology, a probability may be determined based on the degree of similarity between the past state transitions of the web application and state transitions of a particular use case, using the following relationship:

$$P_u(S_x \rightarrow S_y) = \frac{\text{number of consecutive states, from current state backward, matching between web application and use case}}{\text{number of states from current state to initial state, in use case}},$$

where, $0 \le P_u(S_x \rightarrow S_y) \le 1$, where $S_x$ is the current state, where $S_y$ is the next state, after the current state in the use case, and where $P_u(S_x \rightarrow S_y)$ is a value for the similarity of state transitions of the web applications and state transitions of the use case. Accordingly, $P_u(S_x \rightarrow S_y)$ may correspond to a probability that the future state of the web application is $S_y$ of the use case. A greater $P_u$ value may indicate a higher probability that future state of the web application is $S_y$. In one or more embodiments of the technology, the probability calculation may be performed for all available use cases, thus resulting in one possible future state with a certain probability, for each use case. The predicted future state may then be chosen from the possible future states based on the magnitude of $P_u$. Alternatively, a number of predicted future states may be chosen, for example, by ranking the possible future states based on their $P_u$, and by then selecting the highest ranking possible future states.

Figure 5A:
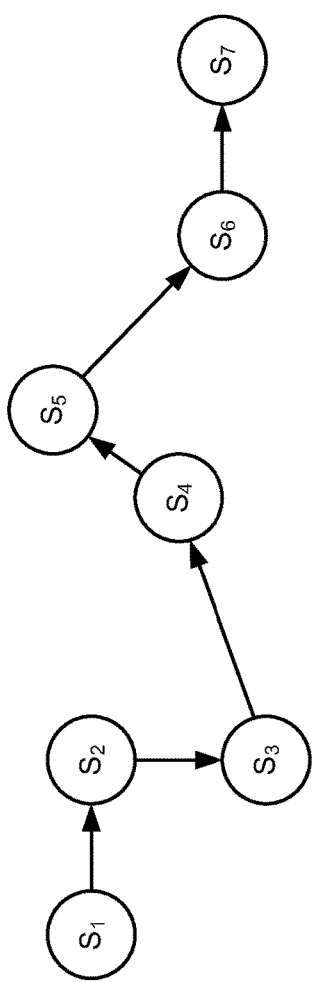
FIG. 5A shows exemplary state transitions of a web application in accordance with one or more embodiments of the technology.
Figure 5B:
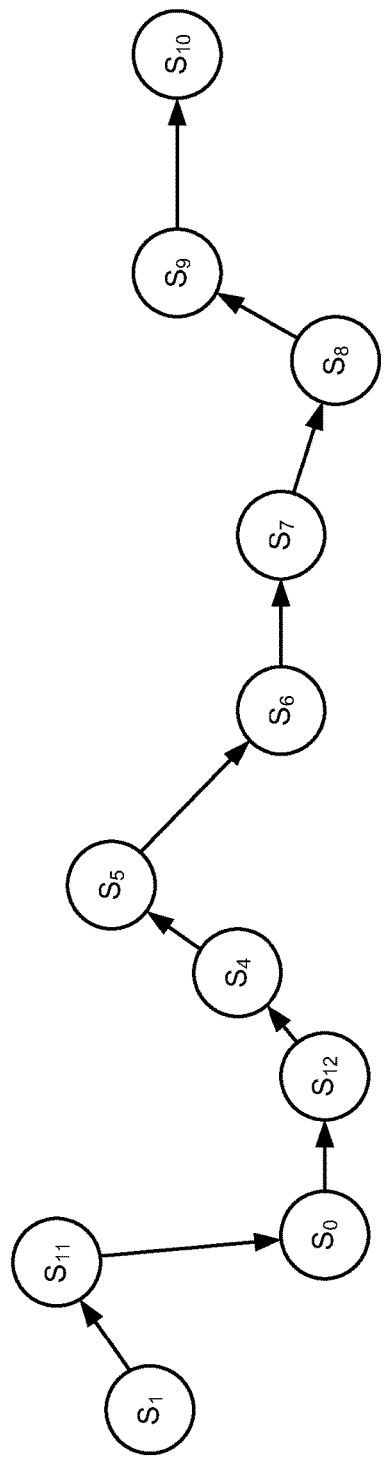
FIG. 5B shows exemplary state transitions of a use case in accordance with one or more embodiments of the technology.

Consider, for example, the exemplary state transitions in the current session of the web application, shown in FIG. 5A, and the exemplary state transitions of a use case, shown in FIG. 5B. In the current session, the web application has transitioned through states $S_1$-$S_6$ to the current state $S_7$, i.e., $S_x=S_7$, in FIG. 5A. The method of Step 302 is now applied in order to determine the possible future state(s) based on the similarity of use cases. FIG. 5B shows one use case whose sequence of states is compared to the states that the web application has transitioned through, toward the current state $S_7$. Comparison of the state transitions of the use case in FIG. 5B and the state transitions of the web application in FIG. 5A reveals that the four consecutive states $S_4$-$S_7$ are identical, whereas the state prior to state $S_4$ deviates. The number of states from the identified current state ($S_7$) to the initial state of the use case ($S_0$) is eight. Accordingly, for the use case shown in FIG. 5B, $P_u(S_7 \rightarrow S_8)=4/8$, with $S_8$ being a possible future state $S_y$. In comparison to another hypothetical use case (not shown), where the possible future state $S_y=S_{15}$, where only three consecutive states are identical, and where the use case is otherwise similar to the use case shown in FIG. 5B, $P_u(S_7 \rightarrow S_8) > P_u(S_7 \rightarrow S_{15})$. The predicted future state is therefore $S_8$ rather than $S_{15}$.

Subsequently, the predicted future state(s) may be analyzed for accessibility based on the run-time application context, as previously described. Predicted future states that are non-accessible may be eliminated.

Continuing with the discussion of FIG. 3, in Step 304, a future state or future states of the web application is/are predicted based on the current state and historical application usage data. First, probabilities for possible future states may be determined based on historical usage data, using the following relationship.

$$P_a(S_x \rightarrow S_y) = \frac{\text{number of state transitions from } S_x \text{ to } S_y}{\text{total number of state transitions originating at } S_x},$$

where, $0 \leq P_a(S_x \rightarrow S_y) \leq 1$, where $S_x$ is the current state, where $S_y$ is the possible future state, obtained from the historical usage analytics data, and where $P_a(S_x \rightarrow S_y)$ is a value for the likeliness of the possible future state $S_y$, given the current state $S_x$. The likeliness is determined based on a ratio of the number of state transitions detected in the historical usage data, where the state transitions are from state $S_x$ to state $S_y$ (numerator), and all state transitions in the historical usage data, where the state transitions originate from state $S_x$ (denominator). Accordingly, $P_a(S_x \rightarrow S_y)$ may correspond to a likeliness of the possible future state $S_y$. A greater $P_a$ value may indicate a higher probability that future state of the web application is $S_y$. In one or more embodiments of the technology, the probability calculation may be performed for all possible future states, obtained from the historical usage analytics data. Next, the predicted future state may be chosen from the possible future states, based on the magnitude of $P_a$. Alternatively, a number of predicted future states may be chosen, for example, by ranking the possible future states based on their $P_a$, and by then selecting the highest ranking possible future states.

Consider, for example, a scenario where the current state is $S_{21}$. The method of Step 304 is now applied in order to determine the possible future state(s) based on historical usage analytics data. In the hypothetical scenario, data from the application usage analytics repository indicate that three types of state transitions, from current state $S_{21}$ have been recorded in the past. A first type of state transition to state $S_{55}$ has been registered 100 times. A second type of state transition to state $S_1$ has been registered 3 times, and a third type of state transition to state $S_{60}$ has been registered 20 times. No transitions from state $S_{21}$ to other states exist in the application usage analytics repository. Accordingly, $$P_a(S_{21} \rightarrow S_{55}) = \frac{100}{100 + 3 + 20}$$

results in the highest $P_a$ and the predicted future state is therefore $S_{55}$ rather than $S_1$ or $S_{60}$.

Subsequently, the predicted future state(s) may be analyzed for accessibility based on the run-time application context, as previously described. Predicted future states that are non-accessible may be eliminated.

Those skilled in the art will appreciate that the technology is not limited to the aforementioned methods of Steps 302 and 304 for determining the next state of the web application. Any method, including probabilistic and non-probabilistic methods, capable of providing a prediction of a future state may be employed.

Continuing with the discussion of FIG. 3, in Step 306, the predicted future states, based on the probabilities $P_u(S_x \rightarrow S_y)$ (Step 302) and $P_a(S_x \rightarrow S_y)$ (Step 304) are combined to obtain a combination of predicted future states, based on the probability $P(S_x \rightarrow S_y)$. The following relationship may be used:

$P(S_x \rightarrow S_y) = W_u P_u(S_x \rightarrow S_y) + W_a P_a(S_x \rightarrow S_y)$, where $\forall W_u, W_a 0 \leq W_u, W_a \leq 1$ and $W_u + W_a = 1$, where $W_u$ is a weight assigned to the use case data and where $W_a$ is a weight assigned to the historical application usage data. $W_u$ and $W_a$ may therefore be used to adjust the emphasis of predictions based on use case data versus predictions based on historical application usage data and vice versa.

Consider, for example, a scenario where the method in Step 302 resulted in the prediction of future states S7 and S8, and where the method of Step 304 resulted in the prediction of future states S8, S9, S10. In Step 306, the states S7, S8, S9, S10 may then be analyzed for their likeliness, i.e., a $P(S_x \rightarrow S_y)$ (as defined in Step 306) may be determined for each of these states.

In Step 308, a determination is made about whether multiple future states were predicted. If only a single future state was predicted, the method may proceed to Step 312. If multiple future states were predicted, the method may proceed to Step 310.

In Step 310, the future state(s) with the highest probability is/are identified. In one or more embodiments of the technology, the predicted future state with the highest $P(S_x \rightarrow S_y)$, or a set of predicted future states with a high $P(S_x \rightarrow S_y)$ in comparison to other predicted future states may be selected as the predicted future state(s). The remaining states may be eliminated from consideration.

In Step 312, resource information pertaining to the predicted future state(s) is obtained. The resource information may include any type of software module, content, e.g., data in the form of databases, audio and/or video content to be loaded, etc., services, e.g. third party analytics services, etc., necessary for the execution of the predicted future state(s). The resource information may be retrieved, for example, from the state module mapping repository.

In Step 314, the resource information is provided to the web application.

FIGS. 4-5B describe various examples in accordance with one or more embodiments of the technology. The examples are not intended to limit the scope of the technology.

FIG. 4 shows an exemplary web application modeled as a state machine. In one or more embodiments of the technology, the operation of a web application may be modeled as finite state machine, were different phases, e.g., pages of a web application, related settings, etc., may be modeled as states and where transitions between the pages may be modeled as state transitions. In the exemplary model of a web application, shown in FIG. 4, elements of a business application are shown. The business application includes a main page "Dashboard", from where various additional pages may be accessed. The rectangular boxes in FIG. 4 represent states, i.e., pages of the business application, and the lines connecting the rectangular boxes represent possible state transitions, enabling a user to navigate from one page to another page. Various states in the application shown in FIG. 4 are mapped to various features provided as part of application. Users may navigate through various states of the application in a structured manner in order to perform a particular task. The states traversed while performing such a task may form a use case, as previously described. Use cases and the states an application transitions through may be displayed as graphs, similar to those shown in FIGS. 5A and 5B.

FIG. 5A shows exemplary state transitions of a web application. The web application has transitioned through states $S_1$-$S_6$ and is currently in state $S_7$. The exemplary state transitions were observed while a user performed a frequently occurring task. States $S_4$-$S_7$ are also included in the use case shown in FIG. 5B.

FIG. 5B shows exemplary state transitions captured in a use case. The exemplary use case represents a particular task performed using the web application. The task may be a frequently occurring task and at least some of the states of the use case may therefore be repeated when the application is operated by a user.

Embodiments of the technology may be implemented on a computing system. Any combination of mobile, desktop, server, embedded, or other types of hardware may be used.

Figure 6:
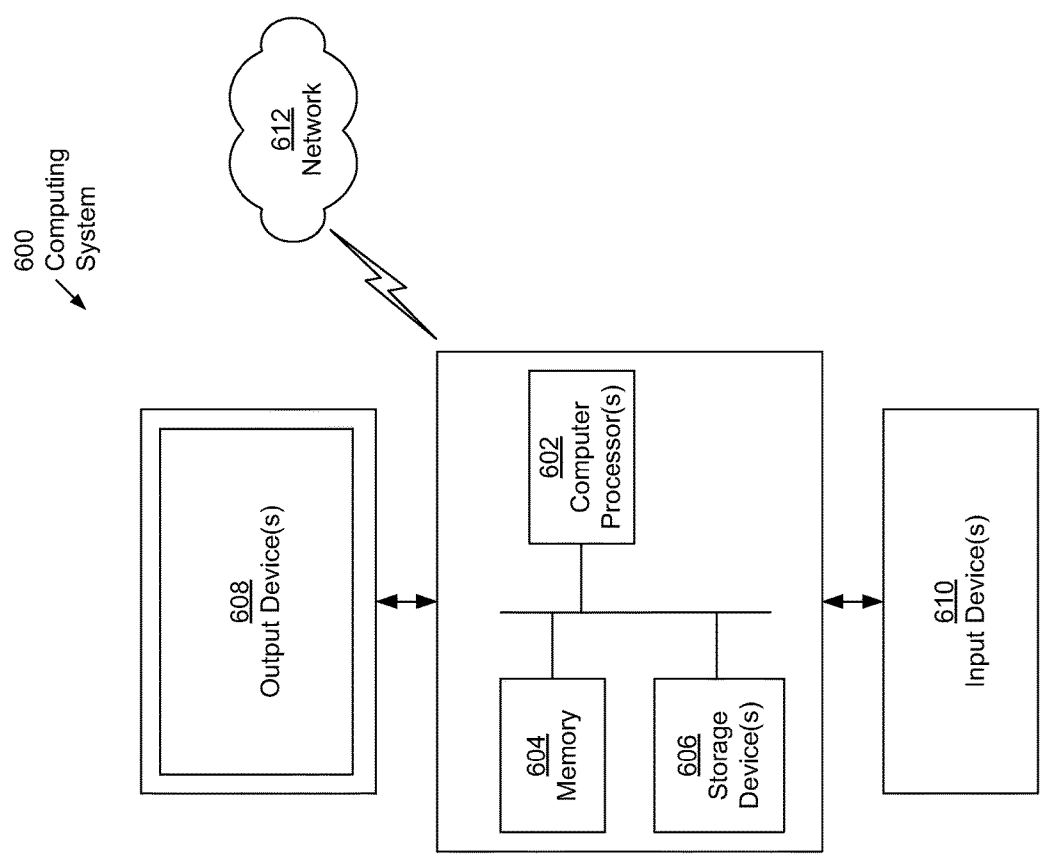
FIG. 6 shows a computing system in accordance with one or more embodiments of the technology.

For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

Embodiments of the technology may enable a software application to efficiently load resources. Rather than loading a resource when a state of the application, requiring the resource, is accessed, the resource may be loaded preemptively, thus reducing the delay when accessing the state. Multiple prediction methods may be used to increase the likeliness of a correct prediction, regardless of the type of application and user interactions with the application. The prediction algorithms may not generate a significant computational load, thus limiting any negative affect on the application performance.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for predictive loading of software resources in web applications, comprising:
   determining, based on a current state of the web application, at least one predicted future state of the web application,
       wherein determining the at least one predicted future state comprises:
           predicting a first set of possible future states based on use case data and determining an associated probability for each possible future state in the first set of possible future states, wherein the use case data specifies a sequence of states and state transitions obtained from modeling tasks frequently performed by users of the web application;
           identifying, from the first set of possible future states, a first predicted future state, wherein the first predicted future state is the possible future state in the first set of possible future states with the highest associated probability;
           predicting a second set of possible future states based on historical usage analytics data;
           determining an associated probability for each possible future state in the second set of possible future states;
           identifying, from the second set of possible future states, a second predicted future state, wherein the second predicted future state is the possible future state in the second set of possible future states with the highest associated probability;
           determining that the first and the second predicted future state are identical; and
           obtaining a combined probability comprising the probability associated with the first predicted future state, adjusted by a first weighting factor, and the probability associated with the second predicted future state, adjusted by a second weighting factor;
   determining resources required by the at least one predicted future state; and
   loading the resources required by the at least one predicted future state.

2. The method of claim 1, wherein the software resource is at least one selected from the group consisting of code comprising executable instructions, content, and services.

3. The method of claim 1, wherein predicting the first set of possible future states based on use case data comprises:
   identifying, in the use case data, use cases comprising the current state of the web application;
   determining, from the use cases comprising the current state of the web application, the first set of possible future states; and
   determining, for each possible future state in the first set of possible future states, the associated probability.

4. The method of claim 3, wherein the determining the associated probability comprises:
   determining a cardinality of matching states between the use case data and a current session of the web application.

5. The method of claim 1, wherein determining the probability for each possible future state in the second set of possible future states comprises:

identifying, in the historical usage analytics data, occurrences of the current state of the web application;

determining, from the occurrences of the current state in historical usage analytics data, the second set of possible future states;

determining, for each possible future state in the second set of possible future states, the associated probability.

6. The method of claim 5, wherein determining, for each possible future state in the second set of possible future states, the associated probability comprises:

for a possible future state in the second set of possible future states, determining a ratio between a cardinality of state transitions from the current state of the application to the possible future state and a cardinality of all state transitions originating from the current state.

7. The method of claim 1, further comprising, prior to determining resources required by the at least one predicted future state:

determining the run-time application context;

identifying, based on the run-time context, that a predicted future state of the at least one predicted future state is not accessible;

removing the identified predicted future state from the at least one predicted future state.

8. The method of claim 7, the run-time application context comprises at least one selected from the group consisting of subscriptions and user privileges.

9. A non-transitory computer readable medium (CRM) storing instructions for predictive loading of software resources in web applications, comprising:

determining, based on a current state of the web application, at least one predicted future state of the web application, wherein determining the at least one predicted future state comprises:

predicting a first set of possible future states based on use case data and determining an associated probability for each possible future state in the first set of possible future states, wherein the use case data specifies a sequence of states and state transitions obtained from modeling tasks frequently performed by users of the web application;

identifying, from the first set of possible future states, a first predicted future state, wherein the first predicted future state is the possible future state in the first set of possible future states with the highest associated probability;

predicting a second set of possible future states based on historical usage analytics data;

determining an associated probability for each possible future state in the second set of possible future states;

identifying, from the second set of possible future states, a second predicted future state, wherein the second predicted future state is the possible future state in the second set of possible future states with the highest associated probability;

determining that the first and the second predicted future state are identical; and obtaining a combined probability comprising the probability associated with the first predicted future state, adjusted by a first weighting factor, and the probability associated with the second predicted future state, adjusted by a second weighting factor;

determining resources required by the at least one predicted future state; and loading the resources required by the at least one predicted future state.

10. The non-transitory CRM of claim 9, wherein predicting the first set of possible future states based on use case data comprises:

identifying, in the use case data, use cases comprising the current state of the web application;

determining, from the use cases comprising the current state of the web application, the first set of possible future states; and determining, for each possible future state in the first set of possible future states, the associated probability.

11. The non-transitory CRM of claim 9, wherein the instructions for predictive loading of software resources in web applications further comprise, prior to determining resources required by the at least one predicted future state:

determining the run-time application context;

identifying, based on the run-time context, that a predicted future state of the at least one predicted future state is not accessible;

removing the identified predicted future state from the at least one predicted future state.

12. A system for predictive loading of software resources in web applications, comprising:

a computer processor comprising an integrated circuit;

a web application executing on the computer processor; and a state transition prediction module of the web application, configured to:

determine, based on a current state of the web application, at least one predicted future state of the web application, wherein determining the at least one predicted future state comprises:

predicting a first set of possible future states based on use case data, obtained from a use case configuration repository, and determining an associated probability for each possible future state in the first set of possible future states, wherein the use case data specifies a sequence of states and state transitions obtained from modeling tasks frequently performed by users of the web application;

identifying, from the first set of possible future states, a first predicted future state, wherein the first predicted future state is the possible future state in the first set of possible future states with the highest associated probability; and predicting a second set of possible future states based on historical usage analytics data, obtained from an application usage analytics repository;

determining an associated probability for each possible future state in the second set of possible future states;

identifying, from the second set of possible future states, a second predicted future state, wherein the second predicted future state is the possible future state in the second set of possible future states with the highest associated probability;

determining that the first and the second predicted future state are identical; and obtaining a combined probability comprising the probability associated with the first predicted future state, adjusted by a first weighting factor, and the probability associated with the second predicted future state, adjusted by a second weighting factor;

a predictive module loading system of the web application, configured to determine resources required by the at least one predicted future state, based on mappings between application states and resources, stored in a state module mapping repository;

and wherein the web application is configured to load the resources required by the at least one predicted future state.

13. The system of claim 12, wherein predicting the first set of possible future states based on use case data comprises:

identifying, in the use case data, use cases comprising the current state of the web application;

determining, from the use cases comprising the current state of the web application, the first set of possible future states; and determining, for each possible future state in the first set of possible future states, the associated probability.

14. The system of claim 12, wherein the web application is further configured to, prior to determining resources required by the at least one predicted future state, by the predictive module loading system:

determine, the run-time application context; and wherein the state transition prediction module is further configured to:

identify, based on the run-time context, that a predicted future state of the at least one predicted future state is not accessible; and remove the identified predicted future state from the at least one predicted future state.

* * * * *